(12) United States Patent
Suparna et al.

(10) Patent No.: US 10,360,066 B2
(45) Date of Patent: Jul. 23, 2019

(54) WORKFLOW GENERATION FROM NATURAL LANGUAGE STATEMENTS

(71) Applicant: Hewlett Packard Enterprise Development LP, Houston, TX (US)

(72) Inventors: Adarsh Suparna, Bangalore (IN); Pramod Annachira Vitala, Bangalore (IN)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 0 days.

(21) Appl. No.: 15/420,272

(22) Filed: Jan. 31, 2017

(65) Prior Publication Data
US 2018/0113850 A1    Apr. 26, 2018

(30) Foreign Application Priority Data

Oct. 25, 2016   (IN) .............................. 201641036608

(51) Int. Cl.
*G06F 17/27*    (2006.01)
*G06F 9/48*     (2006.01)

(52) U.S. Cl.
CPC .......... *G06F 9/4881* (2013.01); *G06F 17/277* (2013.01); *G06F 17/2735* (2013.01); *G06F 17/2795* (2013.01)

(58) Field of Classification Search
CPC ...................................................... G06F 17/02
USPC ........................... 704/1, 9, 10, 257, 270–275
See application file for complete search history.

(56) References Cited

U.S. PATENT DOCUMENTS

| | | | |
|---|---|---|---|
| 6,487,545 B1* | 11/2002 | Wical .................... | G06F 17/271 706/45 |
| 2006/0168513 A1* | 7/2006 | Coulson .............. | G06F 17/2247 715/234 |
| 2009/0292527 A1* | 11/2009 | Anderson ............. | G06F 17/276 704/9 |
| 2013/0226846 A1* | 8/2013 | Li ........................... | G06N 5/02 706/12 |
| 2014/0280805 A1* | 9/2014 | Sawalha ............... | G06F 9/5072 709/222 |
| 2016/0162819 A1* | 6/2016 | Hakman ........... | G06Q 10/0633 705/7.27 |
| 2017/0109695 A1* | 4/2017 | Balusamy ........ | G06Q 10/08345 |

* cited by examiner

*Primary Examiner* — Jesse S Pullias

(57) ABSTRACT

In one example in accordance with the present disclosure, a method may include classifying each word in a natural language statement and determining an implementation, from a set of possible implementations, for a workflow platform based on the classified words. The method may also include mapping a first of the classified words to a task selected from a set of possible tasks associated with the implementation and mapping a second of the classified words to an input parameter associated with the task. The method may also include generating a workflow for the workflow platform using the task and the input.

19 Claims, 10 Drawing Sheets

WORKFLOW GENERATION FROM NATURAL LANGUAGE STATEMENTS

BACKGROUND

Cloud based data centers consist of various components to be deployed and managed. Flow-based orchestration tools may be used for managing deployed applications.

BRIEF DESCRIPTION OF THE DRAWINGS

The following detailed description references the drawings, wherein.

DETAILED DESCRIPTION

Flow-based orchestration tools may be used to create custom workflows using data serialization standards, such as YAML. These YAML files may be used to generate automation workflows.

Manual creation of these workflows may be time consuming and error prone. For example, users may have to acquire skills to develop these complex datacenter centric workflows such as knowledge of the data serialization standards and knowledge of the tools. Moreover, the functionality and options available to the user may not be obvious. Embodiments of systems and methods for workflow generation from natural language statements discussed herein address this problem by using Natural language processing (NLP) in creating workflows.

Embodiments of the systems and methods discussed herein generate YAML instructions using the instructions given by the user in a natural language statement (such as English). These YAML files may be used by a workflow platform to generate automation workflows.

An example method workflow generation from natural language statements may include classifying each word in a natural language statement and determining an implementation, from a set of possible implementations, for a workflow platform based on the classified words. The method may also include mapping a first of the classified words to a task selected from a set of possible tasks associated with the implementation and mapping a second of the classified words to an input parameter associated with the task. The method may also include generating a workflow for the workflow platform using the task and the input.

Figure 1:
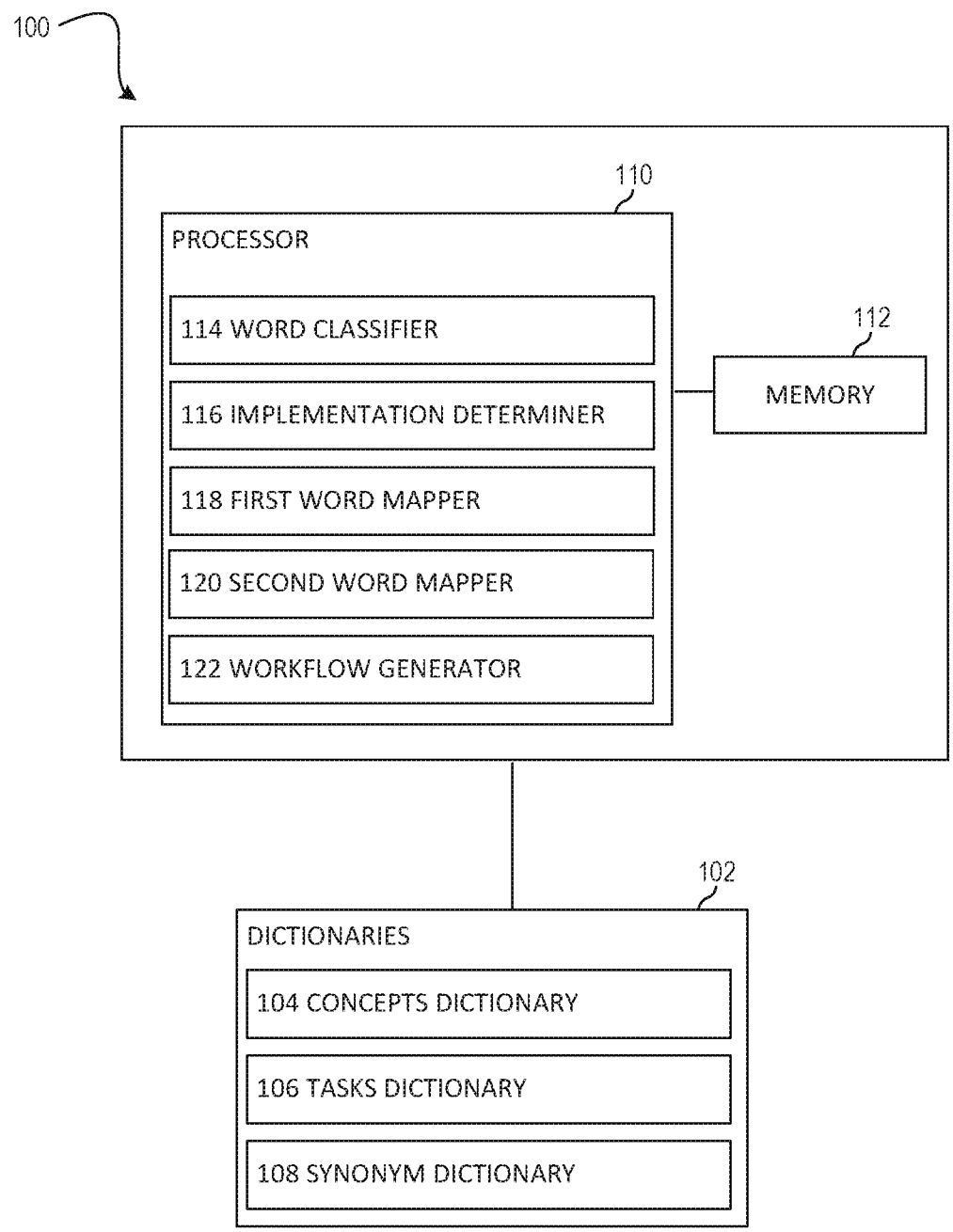
FIG. 1 is a block diagram of an example environment for workflow generation from natural language statements.

FIG. 1 is a block diagram of an example system 100 in which workflow generation from natural language statements may be useful. System 100 may be used to convert a natural language statement into an automation workflow. Specifically, a thematic frame may be created from a natural language statement provided by a user. The thematic frame may be used to create a data serialization file, such as a YAML file. The YAML file may then be used by a workflow platform to create a workflow.

The thematic frame may include an applicable implementation, a task, an applicable object and an input parameter. System 100 may be used to be build the thematic frame using semantic dictionaries 102. Semantic dictionaries 102 may include a concept dictionary 104, task dictionary 106 and synonym dictionary 108.

Concepts dictionary 104 is a database holding the concepts and implementations available for the workflow platform. The concepts are general functionalities available in the workflow platform. Implementations are specific tools used for the general functionalities. For example, virtualization may be a concept in the concept dictionary, which may defined along with implementations such as VMWare, RHEV etc. Concepts dictionary 102 may also include objects (such as VM, template, network) and unit of measurements (MB, GB, etc.) associated with the concepts and/or implementations.

Task dictionary 106 may include tasks for the workflow platform. The tasks may be grouped based on the implementations (VMWare, RHEV) and objects (VM, template, load balancer). Tasks may include, for example, copy, create, deploy, etc.

Synonym dictionary 108 may include details and synonyms for words in the concepts dictionary 104 and the task dictionary 106. For example a synonym for "running" may be "green", "up", "fine", etc. Each synonym may also have an associated context key word used to filter appropriate meaning. For example, in one implementation a server may be known as an instance. Accordingly, the word instance may be associated with the context keyword "server" to define its meaning in the context of the instance.

System 100 may also include a processor 110 and a memory 112 that may be coupled to each other through a communication link (e.g., a bus). Processor 110 may include a Central Processing Unit (CPU) or another suitable hardware processor. In some examples, memory 112 stores machine readable instructions executed by processor 110. Memory 112 may include any suitable combination of volatile and/or non-volatile memory, such as combinations of Random Access Memory (RAM), Read-Only Memory (ROM), flash memory, and/or other suitable memory. Memory 112 may also include a random access non-volatile memory that can retain content when the power is off.

Memory 112 may store instructions to be executed by processor 110 including instructions for implementing word classifier 114, implementation determiner 116, first word mapper 118, second word mapper 120, workflow generator 122 and/or other components. Furthermore, in FIG. 1 and other Figures described herein, different numbers of components or entities than depicted may be used.

Processor 110 may execute instructions of word classifier 114 to classify each word in a natural language statement based on part of speech. Each word in the natural language statement may be classified, for example, as one of a noun, a verb, an adjective and a preposition. Words that do not fit one of the classifications may be ignored, classified in an "other" category or classified as a similar part of speech.

Processor 110 may execute instructions of implantation determiner 116 to determine an implementation for a workflow platform based on the classified words. The implementation may be selected from a plurality of implementations included in a first dictionary, such as concepts dictionary 104. The first dictionary includes functionalities supported by the workflow platform and implementations of the functionalities. As described above, a workflow platform, such as a workflow platform for creating workflows for deploying and/or managing components of a cloud based data center, may have a variety of supported functionalities. These functionalities may be represented by concepts in concept dictionary 104. An example concept may be virtual machine, and an example implementation may be, for example, VMWare.

Implementation determiner 114 may identify a word that has been classified as a noun from the natural language statement and determine that the noun matches an implementation corresponding to the noun. Implementation determiner 114 may also map the noun to the implementation. Determining a proper implementation from a noun in the natural language statement will be discussed in further detail below, in reference to FIG. 3.

Processor 110 may execute instructions of first word mapper 118 to map a first of the classified words (e.g. as discussed above in reference to word classifier 114) to a task selected from a second dictionary. The second dictionary may include tasks associated with the implementation. The second dictionary may be, for example, task dictionary 106. First word mapper 118 may identify a verb from the classified words and analyze the second dictionary to determine a task associated with the implementation that corresponds to the identified verb. Determining a task from a verb in the natural language statement will be discussed in further detail below, in reference to FIG. 4.

Processor 110 may execute instructions of second word mapper 120 to map a second of the classified words to an input parameter associated with the task. Second word mapper 120 may identify a group of unmapped words as potential parameters. Second word mapper 120 may remove any prepositions from the group of unmapped words and may identify a unit of measurement, a parameter and a value from the group of unmapped words. Units of measurement, parameters and values corresponding to the implementation may be retrieved from concepts database 104 and/or task database 106. Identifying parameters will be discussed in further detail below, in reference to FIG. 5.

Processor 110 may execute instructions of workflow generator 122 to generate a workflow for the workflow platform using the task and input. Generating a workflow may include generating a thematic frame using the task and input. The thematic frame may be used to create a data serialization file, such as a YAML file. The YAML file may then be used by a workflow platform to create a workflow.

Figure 2:
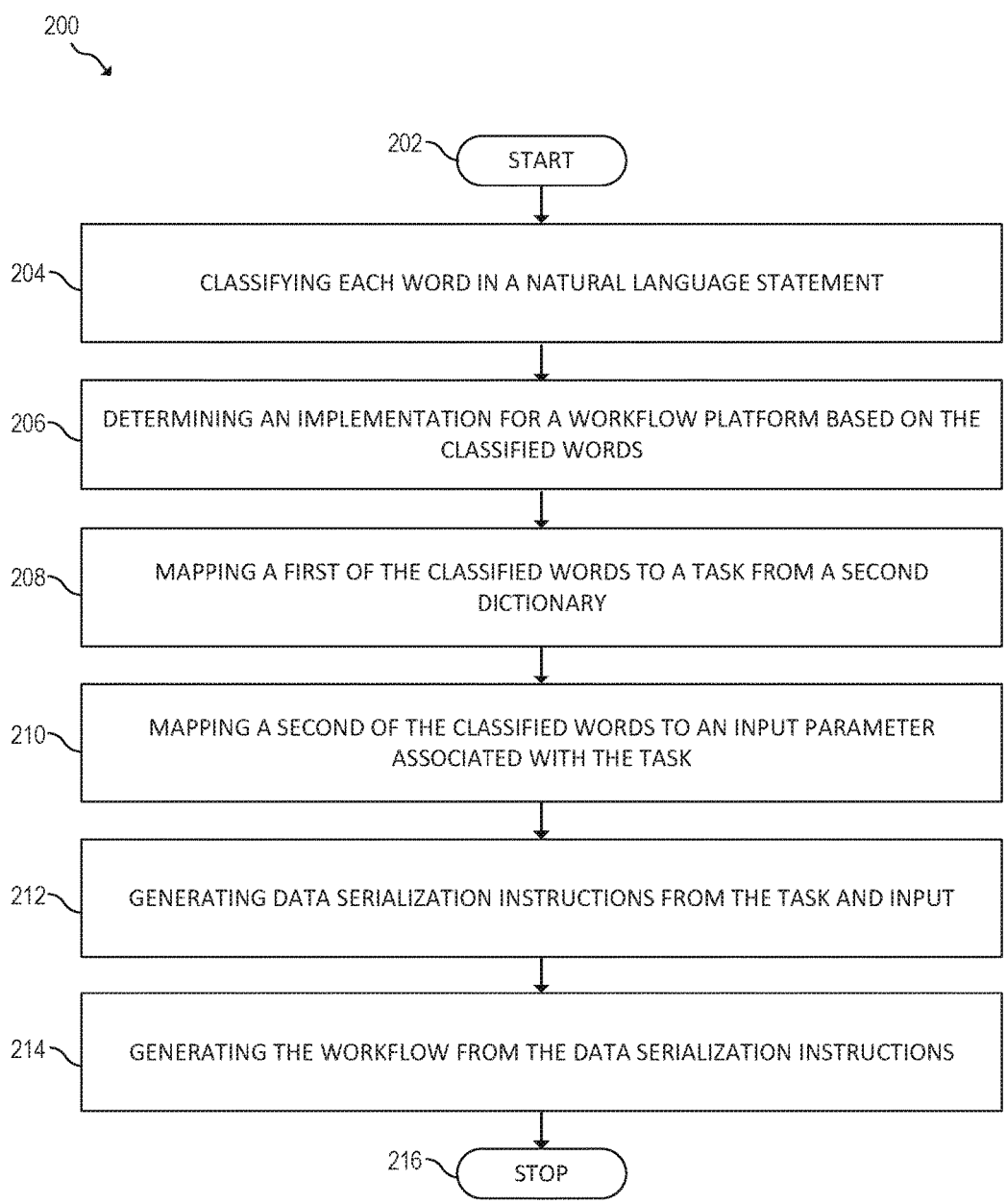
FIG. 2 is a flowchart of an example method for workflow generation from natural language statements.

FIG. 2 is a flowchart of an example method 200 for workflow generation from natural language statements. Method 200 may be described below as being executed or performed by a system, for example, system 100 of FIG. 1 or system 1000 of FIG. 10. Other suitable systems and/or computing devices may be used as well. Method 200 may be implemented in the form of executable instructions stored on at least one machine-readable storage medium of the system and executed by at least one processor of the system. The processor may include a Central Processing Unit (CPU) or another suitable hardware processor. The machine-readable storage medium may be non-transitory. Method 200 may be implemented in the form of electronic circuitry (e.g., hardware). At least one block of method 200 may be executed substantially concurrently or in a different order than shown in FIG. 2. Method 200 may include more or less blocks than are shown in FIG. 2. Some of the blocks of method 200 may, at certain times, be ongoing and/or may repeat.

Figure 3:
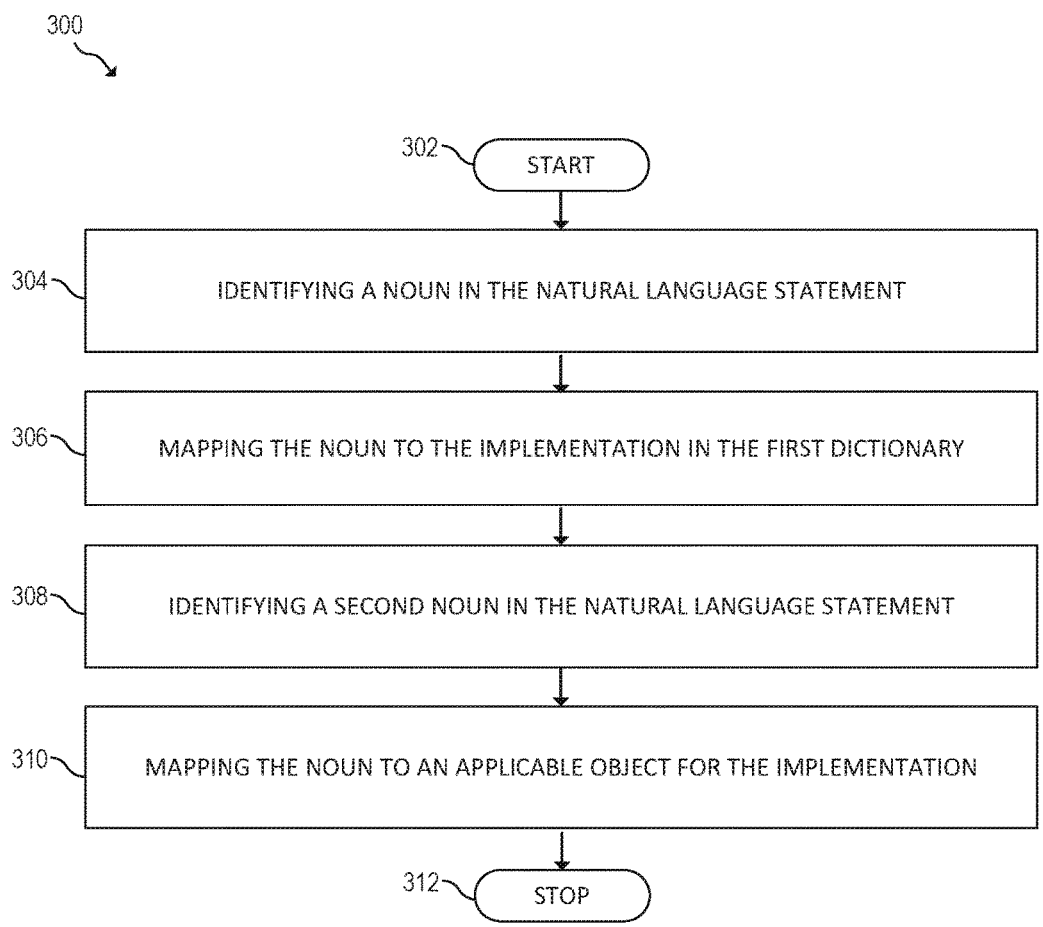
FIG. 3 is a flowchart of an example method for determining an implementation and objects for use in creating a workflow.
Figure 4:
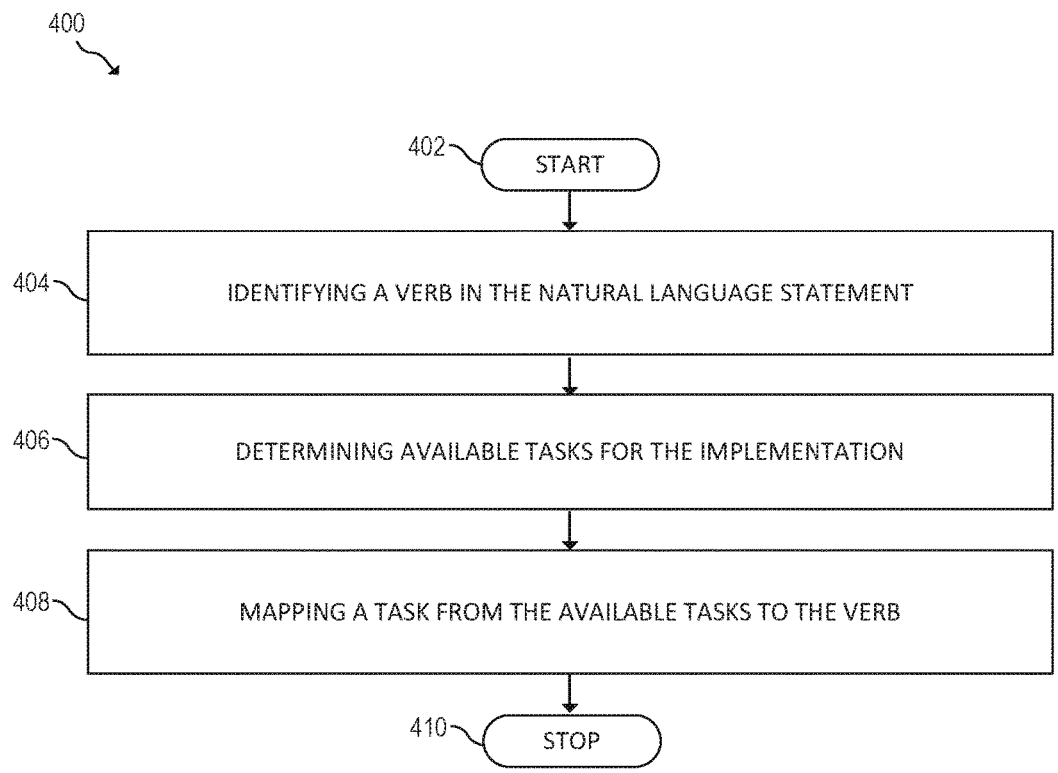
FIG. 4 is a flowchart of an example method for determining a task for a work flow.
Figure 5:
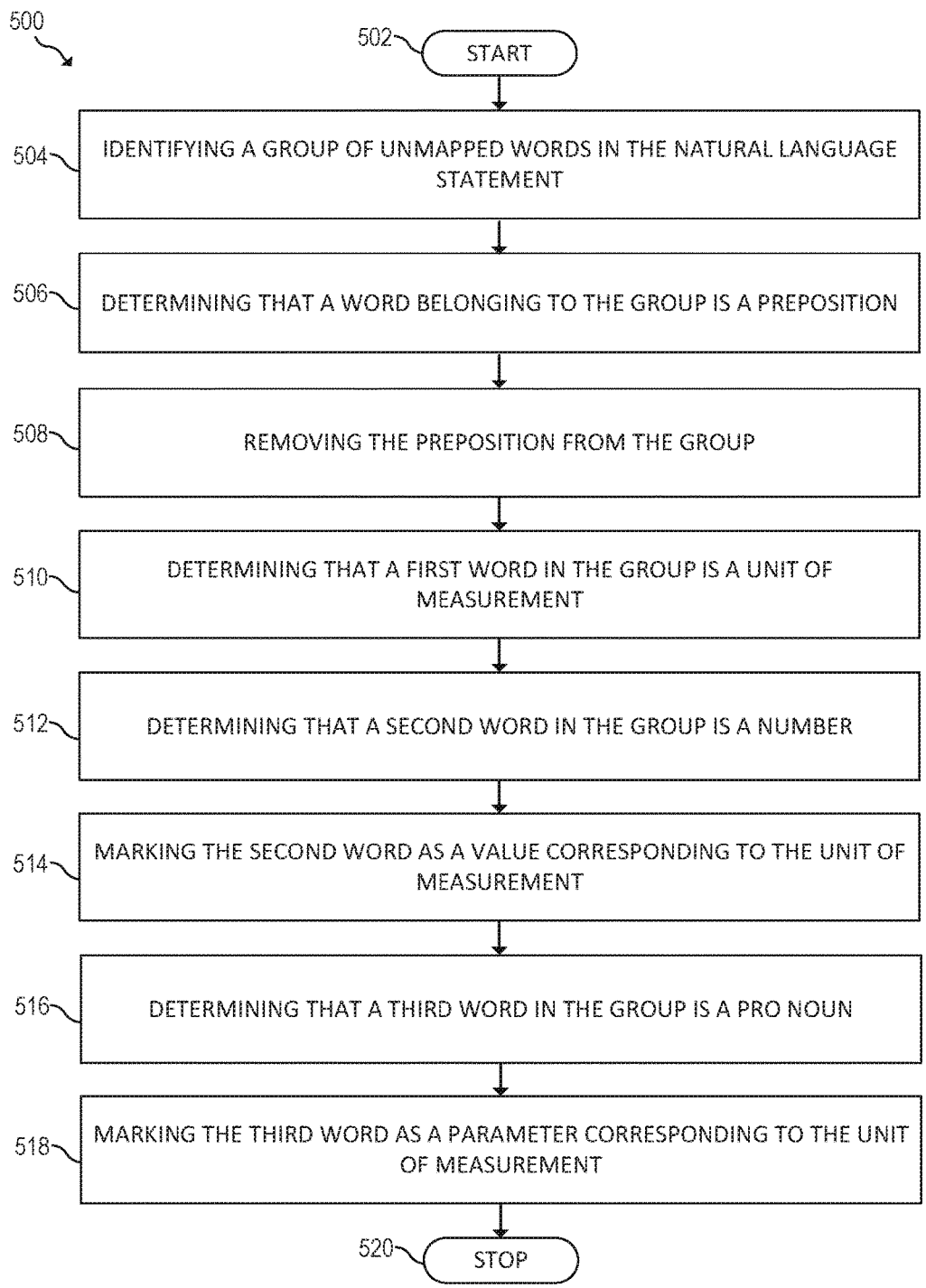
FIG. 5 is a flowchart of an example method for determining an input parameter for a work flow.

Method 200 presents a general overview of workflow generation from natural language statements and the steps of method 200 may be discussed in reference to methods 300-500 depicted in FIGS. 3-5, respectively. Methods 300-500 may be described below as being executed or performed by a system, for example, system 100 of FIG. 1 or system 1000 of FIG. 10. Other suitable systems and/or computing devices may be used as well. Methods 300-500 may be implemented in the form of executable instructions stored on at least one machine-readable storage medium of the system and executed by at least one processor of the system. The processor may include a Central Processing Unit (CPU) or another suitable hardware processor. The machine-readable storage medium may be non-transitory. Methods 300-500 may be implemented in the form of electronic circuitry (e.g., hardware). At least one block of the methods 300-500 may be executed substantially concurrently or in a different order than shown in FIGS. 3-5, respectively. Methods 300-500 may include more or less blocks than are shown in FIGS. 3-5, respectively. Some of the blocks of methods 300-500 may, at certain times, be ongoing and/or may repeat.

Method 200 may start at block 202 and continue to block 204, where the method may include classifying each word in a natural language statement. Each word may be classified based on the word's part of speech. In one aspect, the classifications may include noun. Verb, preposition, adjective, pro noun and other. Words that do not fit one of the classifications may be ignored, classified in the "other" category or classified as a similar part of speech.

At block 206, the method may include determining an implementation for a workflow platform based on the classified words.

Turning to FIG. 3, a method 300 is presented for determining an implementation and objects for use in creating a workflow. Method 300 may start at block 302 and continue to block 304, where the method may include identifying a noun in the natural language statement. At block 306, the method may include mapping the noun to the implementation in the first dictionary. The implementation may be identified by matching a word (from the natural language statement) classified as a noun to an implementation in a first dictionary and mark the identified noun as implementation. If no matching implementations are found, the noun may marked as blank. The implementation may be selected from a plurality of implementations included in a first dictionary, such as the concepts dictionary 104 of system 100. The first dictionary includes functionalities supported by the workflow platform and implementations of the functionalities. As described above, a workflow platform, such as a workflow platform for creating workflows for deploying and/or managing components of a cloud based data center, may have a variety of supported functionalities. These functionalities may be represented by concepts in concept dictionary 104. An example concept may be virtual machine, and an example implementation may be, for example, VMWare.

At block 308, the method 300 may include identifying a second noun in the natural language statement and at block 310 the method 300 may include mapping the noun to an applicable object for the implementation. The objects may be selected from a plurality of objects associated with the implementation included in a first dictionary, such as the concepts dictionary 104 of system 100. The first dictionary includes implementations supported by the workflow platform and objects associated with the implementation. Example objects for a virtual machine implementation, such as VMWare, may include virtual machine, snapshot and template. The method 300 may continue to block 312, where the method may end.

Turning again to method 200, at block 208, the method 200 may include mapping a first of the classified words to a task from a second dictionary. FIG. 4 presents a method 400 for determining a task for a work flow.

The method 400 starts at block 402 and moves to block 404 where the method may include identifying a verb in the natural language statement. In this manner, a word classified as a verb in the natural statement may be used to indicate task name. If more than two verbs are found in a statement, the method may end and the user may be notified and/or prompted of the error with a request to simplify the statement. At block 406, the method may include determining available tasks for the implementation and at block 408 the method may include mapping a task from the available tasks to the verb. The tasks may be selected from a plurality of tasks included in a dictionary, such as the tasks dictionary 106 of system 100. The dictionary may include tasks supported by the workflow platform. Example tasks for a virtual machine implementation, such as VMWare, may include deploy, create, etc. In some aspects, the tasks may be filtered based on the implementation and objects (such as the implementation and objects referred to above in reference to method 300).

Each of the tasks may be loaded in a task dictionary. If a task corresponding to the verb is not found, another lookup may be performed in synonym dictionary (such as synonym dictionary 108 of system 100) to find the appropriate synonym which could be used to find task from task dictionary. If the task is still not found, the method may include determining if the verb matches a task corresponding to any implementation. The method may also include determining if the verb matches a task corresponding to the object but not the implementation. The method 400 may continue to block 410 where the method may end.

Turning again to method 200, at block 210, the method 200 may include mapping a second of the classified words to an input parameter associated with the task. FIG. 5 presents a method 500 for determining an input parameter for a work flow.

The method 500 starts at block 502 and continues to block 504, where the method may include identifying a group of unmapped words in the natural language statement. These words may be unmapped to a task, object, implementation, etc. The group may have a certain number of words. For example, in some aspects the method may identify a group of four or less unclassified words. An example group of words may be "CPU of 6 cores."

At block 506, the method may include determining that a word belonging to the group is a preposition and at block 508 the method may include removing the preposition from the group. In the above example, "CPU of 6 cores," the word "of" may be identified as a preposition and removed from the group. In some aspects, a preposition may not be included in the group of words. In these aspects, one or more words may be removed from the group of words, such as, for example, the first word, the last word, etc. After this, in these aspects the method may proceed to block 510.

At block 510 the method may include determining that a first word in the group is a unit of measurement. In the above example, "CPU 6 cores," the word "cores" may be identified and mapped as a unit of measurement. After one of the words has been identified as a unit of measurement, the group may now have two unmapped words left. In the above example, the group of words may now be "CPU 6." This may indicate that the other two words include a value corresponding to the unit of measurement and name of the parameter corresponding to the unit of measurement. In some aspects, there may not be a unit of measurement. In these aspects, the method may include selecting two words from the group of unmapped words and proceeding to block 512. The method may including selecting two words from the group until a value and parameter is determined. A user may be notified about the missing value.

At block 512, the method may include determining that a second word in the group is a number and at block 514 the method may include marking the second word as a value corresponding to the unit of measurement. In the above example, "CPU 6 cores," the word "6" may be identified and mapped as a value. At block 516 the method may include determining that a third word in the group is a pro noun and at block 518 the method may include marking the third word as a parameter corresponding to the unit of measurement. In the above example, "CPU 6 cores," the word "CPU" may be identified and mapped as the parameter. The method may proceed to block 520 where the method may end.

Turning again to method 200, at block 212, the method 200 may include generating a data serialization instructions, such as YAML instructions, from the task and input and at block 214 the method may include generating the workflow from the data serialization instructions. The method may proceed to block 216 where the method may end.

Figure 6:
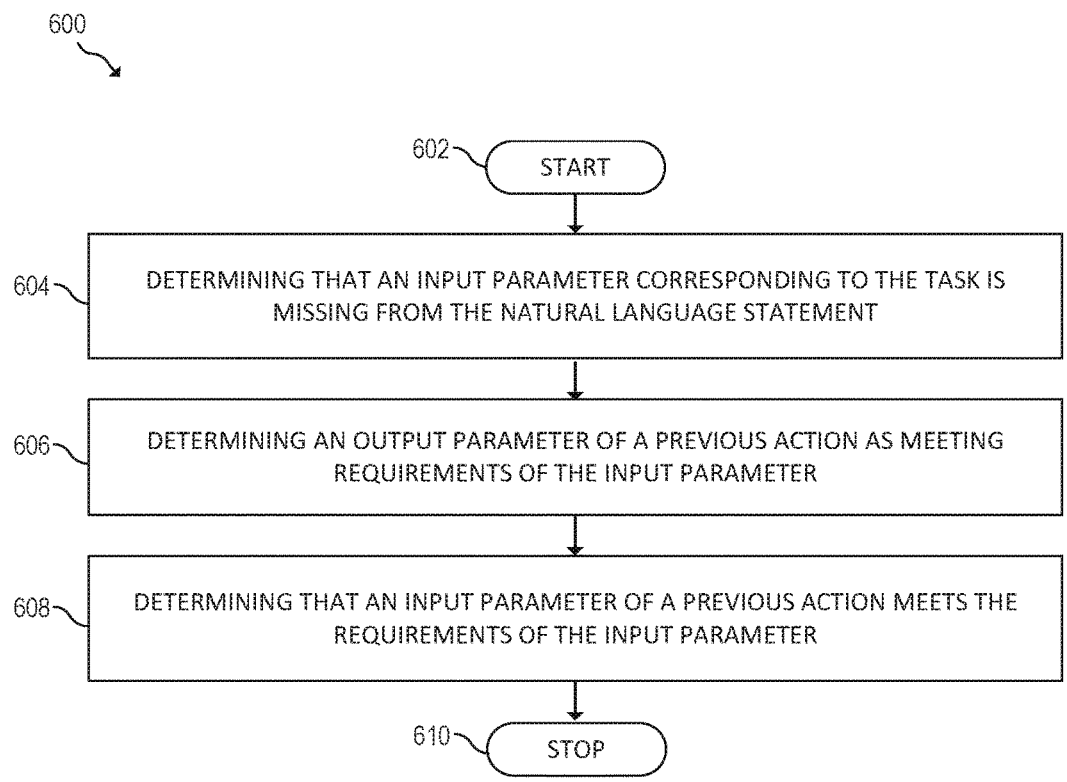
FIG. 6 is a flowchart of an example method for determining parameters from previous user actions.

In some aspects, one of more of the parameters (such as the parameters discussed above in reference to method 500) may be missing from the natural language statement. FIG. 6 is a flowchart of an example method 600 for determining parameters from previous user actions. Previous actions may include may include previous natural language statements, previous workflows, etc. Method 600 may be described below as being executed or performed by a system, for example, system 100 of FIG. 1 or system 1000 of FIG. 10. Other suitable systems and/or computing devices may be used as well. Method 600 may be implemented in the form of executable instructions stored on at least one machine-readable storage medium of the system and executed by at least one processor of the system. The processor may include a Central Processing Unit (CPU) or another suitable hardware processor. The machine-readable storage medium may be non-transitory. Method 600 may be implemented in the form of electronic circuitry (e.g., hardware). At least one block of method 600 may be executed substantially concurrently or in a different order than shown in FIG. 6. Method 600 may include more or less blocks than are shown in FIG. 6. Some of the blocks of method 600 may, at certain times, be ongoing and/or may repeat.

Method 600 may start at block 602 and continue to block 604, where the method may include determining that, aside from the input parameter mapped to the second of the classified words, a different input parameter corresponding to the task is missing from the natural language statement. Although the method is discussed in terms of determining missing input parameters, in some aspects the method 600 may be used to determine other missing words, such as tasks, objects, context, implementation, etc. At block 606, the method may include determining an output parameter of a previous action as meeting requirements of the different input parameter and at block 608 the method may include determining that an input parameter of a previous action meets the requirements of the input parameter of the natural language statement.

Because parameters are being taken from previous actions, the parameters may not be a direct match to the task, implementation, etc. of the natural language statement. Accordingly, the method 600 may use a similarity threshold. The similarity threshold may indicate an acceptable amount of similarity between the different input parameter and the output parameter/input parameter of the previous action. For example, in some aspects the method may implement fuzzy logic to identify a semantic similarity between the parameter names and the parameter descriptions. The parameter description may be based on the implementation, task, object, etc. and/or may be retried from one of the dictionaries (such as the dictionaries 102 of system 100). An input/output parameter of the previous action that has high similarity scores for both parameter name and description may be selected. The selection parameter may be presented to the user for confirmation. In some aspects, the output parameters available from previous actions may be first preference for search and then input parameters from previous actions would be the second preference. The method may proceed to block 610 where the method may end.

Figure 7:
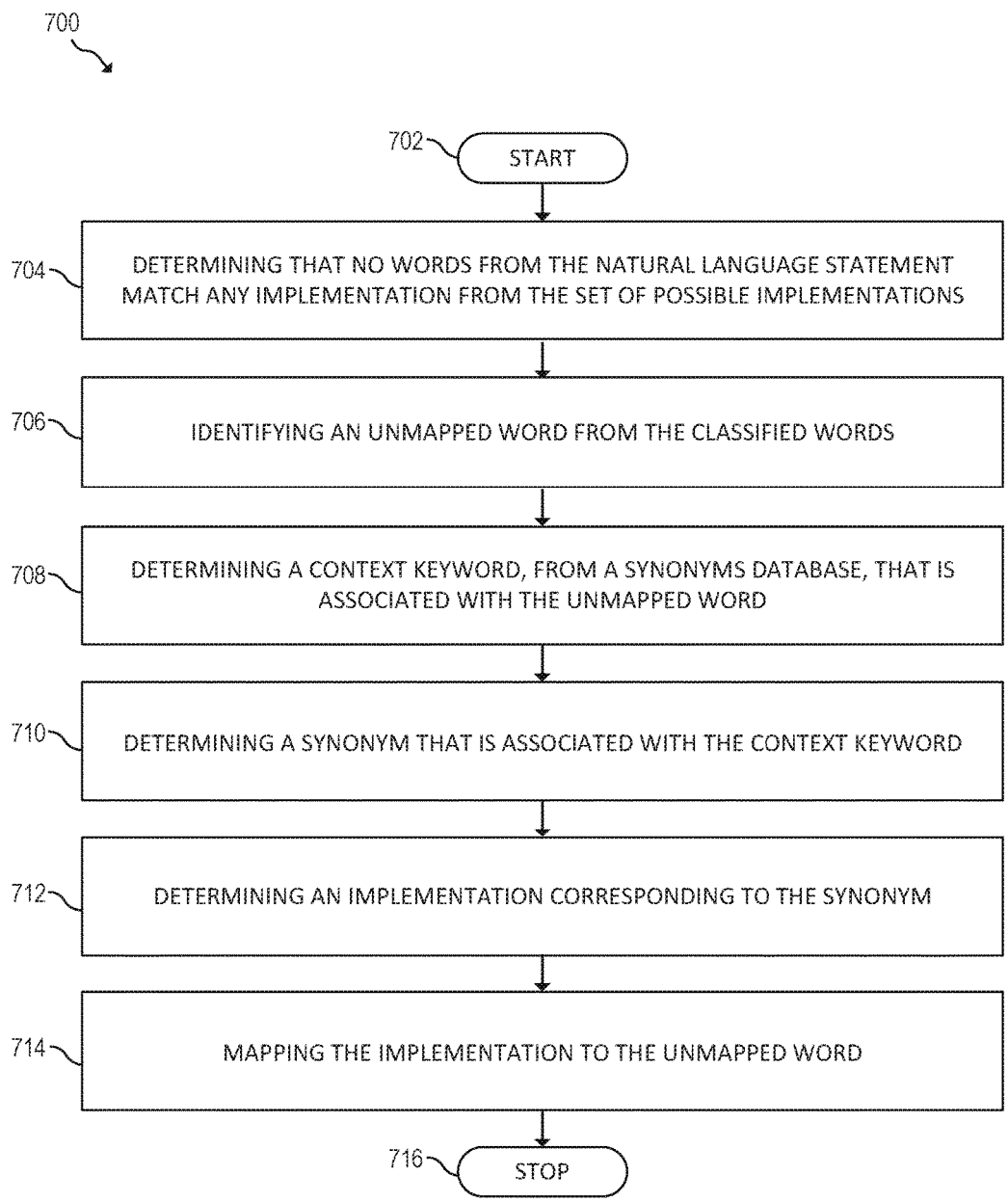
FIG. 7 is a flowchart of an example method for determining synonyms for generating workflows using words in a natural language statement.

In some aspects, one of more of the words in the natural language statement may not correspond to an implementation in a concepts dictionary (such as concepts dictionary 104 of system 100). In these aspects, a synonym dictionary (such as concepts dictionary 104 of system 100) may be used to determine a corresponding implementation. FIG. 7 is a flowchart of an example method 700 for determining synonyms for generating workflows using words in a natural language statement. Although method 700 is described in terms of determining a synonym for an implementation, the method may also be used to determine synonyms for tasks, objects, concepts, units of measurement, values, parameter names, etc.

Method 700 may be described below as being executed or performed by a system, for example, system 100 of FIG. 1 or system 1000 of FIG. 10. Other suitable systems and/or computing devices may be used as well. Method 600 may be implemented in the form of executable instructions stored on at least one machine-readable storage medium of the system and executed by at least one processor of the system. The processor may include a Central Processing Unit (CPU) or another suitable hardware processor. The machine-readable storage medium may be non-transitory. Method 700 may be implemented in the form of electronic circuitry (e.g., hardware). At least one block of method 700 may be executed substantially concurrently or in a different order than shown in FIG. 7. Method 700 may include more or less blocks than are shown in FIG. 7. Some of the blocks of method 700 may, at certain times, be ongoing and/or may repeat.

Method 700 may start at block 702 and continue to block 704, where the method may include determining that no words from the natural language statement match any implementation from the set of possible implementations. At block 706 the method may include identifying an unmapped word from the classified words and at block 708 the method may include determining a context keyword, from a synonyms database, that is associated with the unmapped word. Each word in the synonym dictionary may correspond to a context keyword that is used to define the meaning of the word. For example, in some cloud provider implementations, a server may be known as an instance. Accordingly, the word instance may be associated with the context keyword "server" to define its meaning in the context of the instance. At block 710 the method may include determining a synonym that is associated with the context keyword and at block 712 the method may include determining an implementation corresponding to the synonym. The implementation may be retrieved from a concepts dictionary, such as the concepts dictionary 104 of system 100. At block 714 the method may include mapping the implementation to the unmapped word. The method may proceed to block 716 where the method may end.

Figure 8:
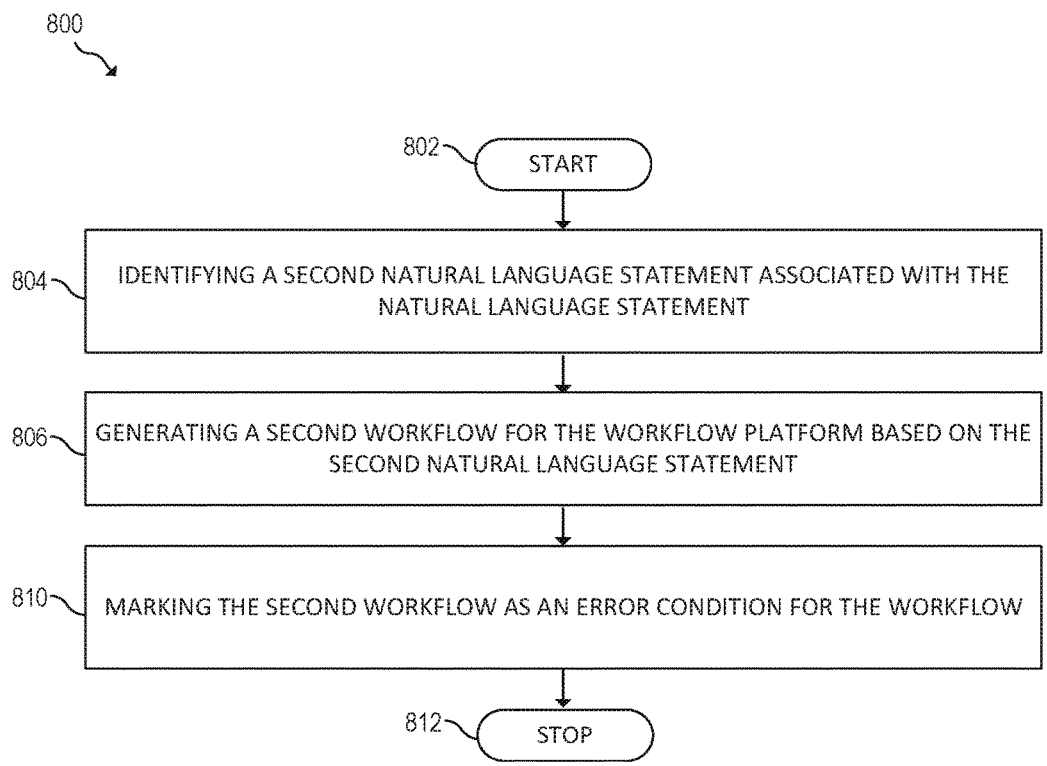
FIG. 8 is a flowchart of an example method for grouping an error condition into a workflow.

FIG. 8 is a flowchart of an example method 800 for grouping an error condition into a workflow. Previous actions may include may include previous natural language statements, previous workflows, etc. Method 800 may be described below as being executed or performed by a system, for example, system 100 of FIG. 1 or system 1000 of FIG. 10. Other suitable systems and/or computing devices may be used as well. Method 800 may be implemented in the form of executable instructions stored on at least one machine-readable storage medium of the system and executed by at least one processor of the system. The processor may include a Central Processing Unit (CPU) or another suitable hardware processor. The machine-readable storage medium may be non-transitory. Method 800 may be implemented in the form of electronic circuitry (e.g., hardware). At least one block of method 800 may be executed substantially concurrently or in a different order than shown in FIG. 8. Method 800 may include more or less blocks than are shown in FIG. 8. Some of the blocks of method 800 may, at certain times, be ongoing and/or may repeat.

Method 800 may start at block 802 and continue to block 804, where the method may include identifying a second natural language statement associated with the natural language statement. In some aspects, an error condition may be supplied by the user as part of the natural language statement and/or as a second natural language statement. In some aspects, the second natural language statement may be identified as a natural language statement based on a user command. In some aspects, it may be determined that the second natural language statement is associated with the natural language statement by a similarity in task, implementation, context, object, etc. In some aspects. It may be assumed that multiple natural language statements submitted in unison or close proximity are associated with each other.

At block 806 the method may include generating a second workflow for the workflow platform based on the second natural language statement. The second workflow may be generated using one of or a combination of the methods 200-700 discussed above in reference to FIGS. 2-7, respectively. At block 810, the method may include marking the second workflow as an error condition for the workflow. The method may also include making a set of the two natural language statements with one being the main action and the other being a related action which would be executed in case of failure condition. In some aspects, the user may not provide an error condition and a default error condition corresponding to the implementation, task, object, etc. may be associated with the first work flow. The method may continue to block 812, where the method may end.

Figure 9:
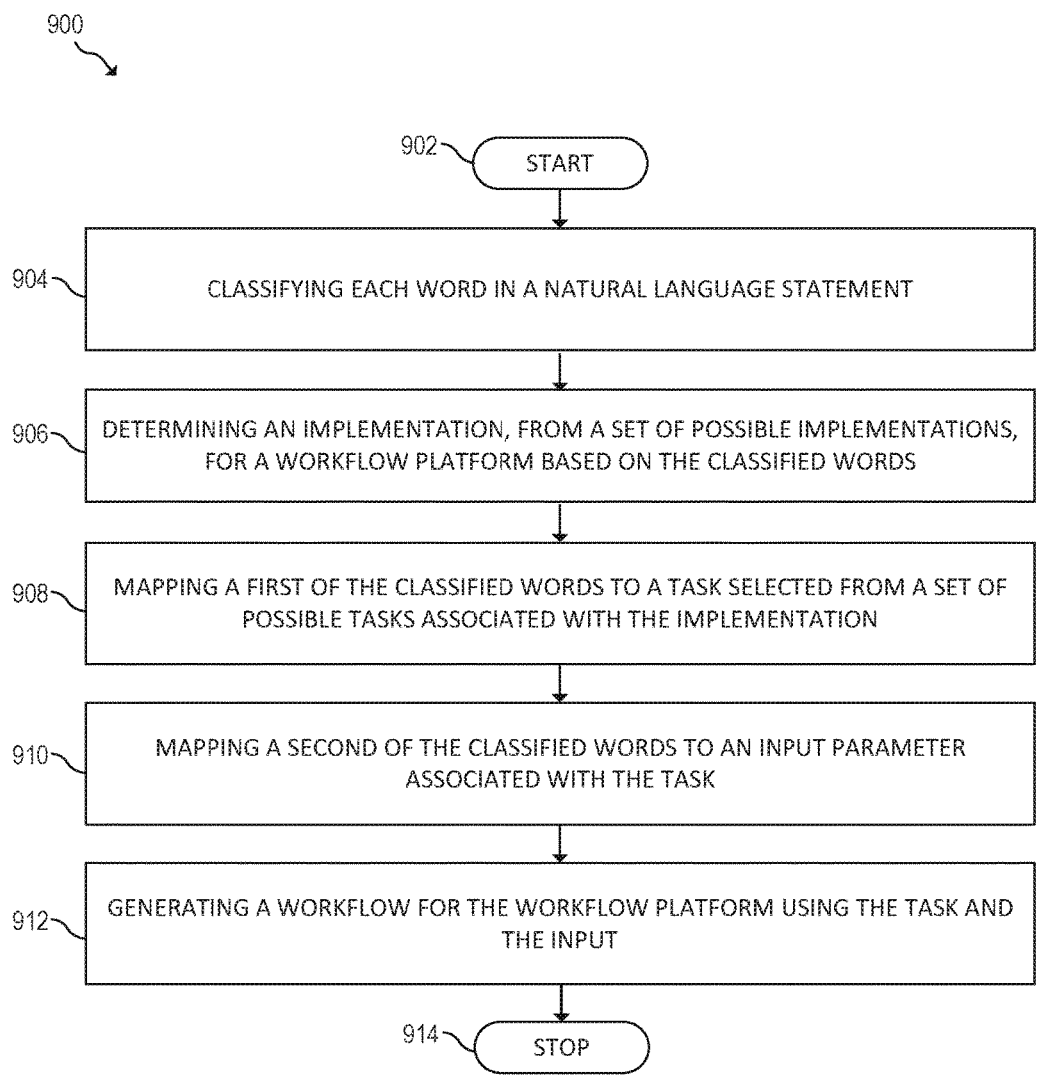
FIG. 9 is a flowchart of another example method for workflow generation from natural language statements.

FIG. 9 is a flowchart of an example method 900 for workflow generation from natural language statements. Method 900 may be described below as being executed or performed by a system, for example, system 100 of FIG. 1 or system 1000 of FIG. 10. Other suitable systems and/or computing devices may be used as well. Method 900 may be implemented in the form of executable instructions stored on at least one machine-readable storage medium of the system and executed by at least one processor of the system. The processor may include a Central Processing Unit (CPU) or another suitable hardware processor. The machine-readable storage medium may be non-transitory. Method 900 may be implemented in the form of electronic circuitry (e.g., hardware). At least one block of method 900 may be executed substantially concurrently or in a different order than shown in FIG. 9. Method 900 may include more or less blocks than are shown in FIG. 9. Some of the blocks of method 900 may, at certain times, be ongoing and/or may repeat.

Method 900 may start at block 902 and continue to block 904, where the method may include classifying each word in a natural language statement. The classifications may include noun, verb, adjective, pronoun and other. At block 906 the method may include determining an implementation, from a set of possible implementations, for a workflow platform based on the classified words and at block 908 the method may include mapping a first of the classified words to a task selected from a set of possible tasks associated with the implementation. At block 910 the method may include mapping a second of the classified words to an input parameter associated with the task and at block 912 the method may include generating a workflow for the workflow platform using the task and the input. The method may proceed to block 914 where the method may end.

Figure 10:
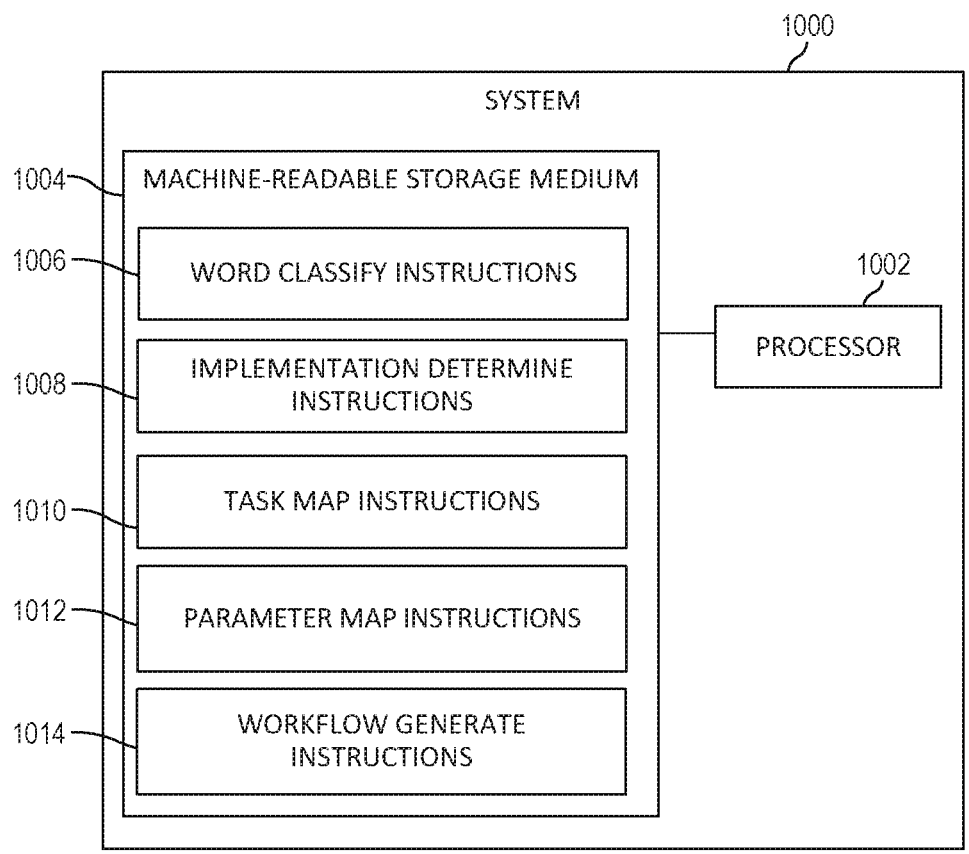
FIG. 10 is a block diagram of an example system for workflow generation from natural language statements.

FIG. 10 is a block diagram of an example system 1000 for workflow generation from natural language statements. System 1000 may be similar to system 100 of FIG. 1, for example. In the example illustrated in FIG. 10, system 1000 includes a processor 1002 and a machine-readable storage medium 1004. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 1002 may be at least one central processing unit (CPU), microprocessor, and/or other hardware devices suitable for retrieval and execution of instructions stored in machine-readable storage medium 1004. In the example illustrated in FIG. 10, processor 1002 may fetch, decode, and execute instructions 1006, 1008, 1010, 1012 and 1014 to perform workflow generation from natural language statements. Processor 1002 may include at least one electronic circuit comprising a number of electronic components for performing the functionality of at least one of the instructions in machine-readable storage medium 1004. With respect to the executable instruction representations (e.g., boxes) described and shown herein, it should be understood that part or all of the executable instructions and/or electronic circuits included within one box may be included in a different box shown in the figures or in a different box not shown.

Machine-readable storage medium 1004 may be any electronic, magnetic, optical, or other physical storage device that stores executable instructions. Thus, machine-readable storage medium 1004 may be, for example, Random Access Memory (RAM), an Electrically-Erasable Programmable Read-Only Memory (EEPROM), a storage drive, an optical disc, and the like. Machine-readable storage medium 504 may be disposed within system 1000, as shown in FIG. 10. In this situation, the executable instructions may be "installed" on the system 1000. Machine-readable storage medium 1004 may be a portable, external or remote storage medium, for example, that allows system 1000 to download the instructions from the portable/external/remote storage medium. In this situation, the executable instructions may be part of an "installation package". As described herein, machine-readable storage medium 1004 may be encoded with executable instructions for context aware data backup. The machine-readable storage medium may be non-transitory.

Referring to FIG. 10, word classify instructions 1006, when executed by a processor (e.g., 1002), may cause system 1000 to classify each word in a natural language statement. Implementation determine instructions 1008, when executed by a processor (e.g., 1002), may cause system 1000 to determine a cloud platform implementation, from a set of possible cloud implementations, for a cloud workflow platform based on the classified words. Task map instructions 1010, when executed by a processor (e.g., 1002), may cause system 1000 to map a first of the classified words to a cloud platform task selected from a set of possible tasks associated with the cloud platform implementation. Parameter map instructions 1012, when executed by a processor (e.g., 1002), may cause system 1000 to map a second of the classified words to an input parameter associated with the cloud platform task. Workflow generate instructions 1014, when executed by a processor (e.g., 1002), may cause system 1000 to generate a workflow for the cloud workflow platform using the cloud platform task and the cloud platform input.

The foregoing disclosure describes a number of examples for workflow generation from natural language statements. The disclosed examples may include systems, devices, computer-readable storage media, and methods for workflow generation from natural language statements. For purposes of explanation, certain examples are described with reference to the components illustrated in FIGS. 1-10. The functionality of the illustrated components may overlap, however, and may be present in a fewer or greater number of elements and components. Further, all or part of the functionality of illustrated elements may co-exist or be distributed among several geographically dispersed locations. Further, the disclosed examples may be implemented in various environments and are not limited to the illustrated examples.

Further, the sequence of operations described in connection with FIGS. 1-10 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples.

We claim:

1. A method comprising:
   classifying, by a computer, each word in a natural language statement;
   determining, by the computer, an implementation, from a set of possible implementations, for a processor-based workflow platform based on the classified words;
   determining, by the computer, available tasks for the determined implementation;
   mapping, by the computer, a first word of the classified words to a task selected from the determined available tasks, wherein the first word comprises a verb;
   mapping, by the computer, a second word of the classified words to an input parameter associated with the task;

determining, by the computer, that, aside from the input parameter mapped to the second word of the classified words, a different input parameter corresponding to the task is missing from the natural language statement;

determining, by the computer, that an output parameter or an input parameter of a previous action meets requirements of the different input parameter; and generating, by the computer, a workflow for the processor-based workflow platform for performing at least one of deploying or managing a component of a cloud-based computer system using the selected task and the input parameter, wherein generating the workflow for the processor-based workflow platform comprises generating a tool for virtualization.

2. The method of claim 1, further comprising:

identifying, by the computer, a noun in the natural language statement; and mapping, by the computer, the noun to the determined implementation from the set of possible implementations.

3. The method of claim 1, further comprising:

identifying, by the computer, a noun in the natural language statement; and mapping, by the computer, the noun to an applicable object for the determined implementation.

4. The method of claim 1, further comprising:

identifying, by the computer, a group of unmapped words in the natural language statement;

determining, by the computer, that a first word in the group is a unit of measurement;

determining, by the computer that a second word in the group is a number;

marking, by the computer, the second word as a parameter corresponding to the unit of measurement;

determining, by the computer, that a third word in the group is a pronoun; and marking, by the computer, the third word as a value corresponding to the unit of measurement.

5. The method of claim 4, further comprising:

determining, by the computer, that a word belonging to the group is a preposition; and removing, by the computer, the preposition from the group.

6. The method of claim 1, further comprising:

identifying, by the computer, a second natural language statement associated with the natural language statement;

generating, by the computer, a second workflow for the workflow platform based on the second natural language statement; and marking, by the computer, the second workflow as an error condition for the workflow.

7. The method of claim 1, wherein classifying, by the computer, each word in the natural language statement comprises assigning each word to at least one of the following classifications: a noun, a verb, an adjective or a preposition.

8. The method of claim 1, further comprising:

generating, by the computer, data serialization instructions from the task and input; and generating, by the computer, the workflow from the data serialization instructions.

9. The method of claim 1, further comprising:

determining, by the computer, that no words from the natural language statement match any implementation from the set of possible implementations;

identifying, by the computer, an unmapped word from the classified words;

determining, by the computer, a context keyword, from a synonyms database, that is associated with the unmapped word;

determining, by the computer, a synonym that is associated with the context keyword;

determining, by the computer, an implementation corresponding to the synonym; and mapping, by the computer, the implementation to the unmapped word.

10. The method of claim 1, wherein determining that an output parameter or an input parameter of a previous action meets requirements of the different input parameter comprises:

applying, by the computer, fuzzy logic to determine a semantic similarity between the different input parameter and the output parameter or input parameter of the previous action, and applying, by the computer, fuzzy logic to determine a semantic similarity between a description of the different input parameter and a description of the output parameter or input parameter of the previous action.

11. A system comprising:

at least one processor; and a memory to store instructions that, when executed by the at least one processor, cause the at least one processor to:

classify each word in a natural language statement based on a part of speech associated with the word;

determine an implementation, from a first dictionary, for a processor-based workflow platform based on the classified words, wherein the first dictionary includes functionalities supported by the processor-based workflow platform and implementations of the functionalities;

map a first word of the classified words to a task selected from a second dictionary, wherein the second dictionary includes tasks associated with the implementation;

map a second word of the classified words to an input parameter associated with the selected task;

determine that, aside from the input parameter mapped to the second word of the classified words, a different input parameter corresponding to the task is missing from the natural language statement;

determine that an output parameter or an input parameter of a previous action meets requirements of the different input parameter; and generate a workflow for the processor-based workflow platform to perform at least one of deploying or managing a cloud-based computer system using the selected task and the input parameter, wherein generating the workflow for the processor-based workflow platform comprises generating a workflow to deploy or create a virtual machine.

12. The system of claim 11, wherein the instructions, when executed by the at least one processor, cause the at least one processor to:

identify a first noun in the natural language statement;

map the noun to the implementation from the first dictionary;

identify a second noun in the natural language statement; and map the noun to an applicable object for the implementation.

13. The system of claim 11, wherein the instructions, when executed by the at least one processor, cause the at least one processor to:
- identify a verb in the natural language statement;
- determine available tasks, from the second dictionary, for the implementation; and
- map the task from the available tasks to the verb.

14. The system of claim 11, wherein the instructions, when executed by the at least one processor, cause the at least one processor to:
- identify a group of unmapped words in the natural language statement;
- determine that a first word in the group is a unit of measurement;
- determine that a second word in the group is a number;
- mark the second word as a parameter corresponding to the unit of measurement;
- determine that a third word in the group is a pronoun; and
- mark the third word as a value corresponding to the unit of measurement.

15. The system of claim 11, wherein generating the workflow to deploy or create the virtual machine comprises selecting a snapshot or a template.

16. A non-transitory machine-readable storage medium encoded with instructions, the instructions executable by a processor of a system to cause the system to:
- classify each word in a natural language statement;
- determine a cloud platform implementation, from a set of possible cloud implementations, for a cloud workflow platform based on the classified words;
- determine available tasks for the determined cloud platform implementation;
- map a first word of the classified words to a cloud platform task selected from the determined tasks available for the determined cloud platform implementation;
- map a second word of the classified words to an input parameter associated with the selected cloud platform task;
- determine that, aside from the input parameter mapped to the second word of the classified words, a different input parameter corresponding to the task is missing from the natural language statement;
- determine that an output parameter or an input parameter of a previous action meets requirements of the different input parameter; and
- generate a workflow for the cloud workflow platform to perform at least one of deploying or managing a cloud-based computer system using the selected cloud platform task and the cloud platform input parameter, wherein generating the workflow for the cloud workflow platform comprises generating a workflow to deploy or create a virtual machine.

17. The non-transitory machine-readable storage medium of claim 16, wherein the instructions executable by the processor of the system further cause the system to:
- identify a first natural language statement associated with the natural language statement;
- generate a first workflow for the cloud workflow platform based on the second natural language statement; and
- mark the first workflow as an error condition for the workflow.

18. The non-transitory machine-readable storage medium of claim 16, wherein the instructions executable by the processor of the system further cause the system to:
- generate YAML instructions from the cloud workflow task and cloud workflow input; and
- generate the workflow from the YAML instructions.

19. The non-transitory machine-readable storage medium of claim 16, wherein generating the workflow to deploy or create the virtual machine comprises selecting a snapshot or a template.

* * * * *